United States Patent Office 3,527,038
Patented Sept. 8, 1970

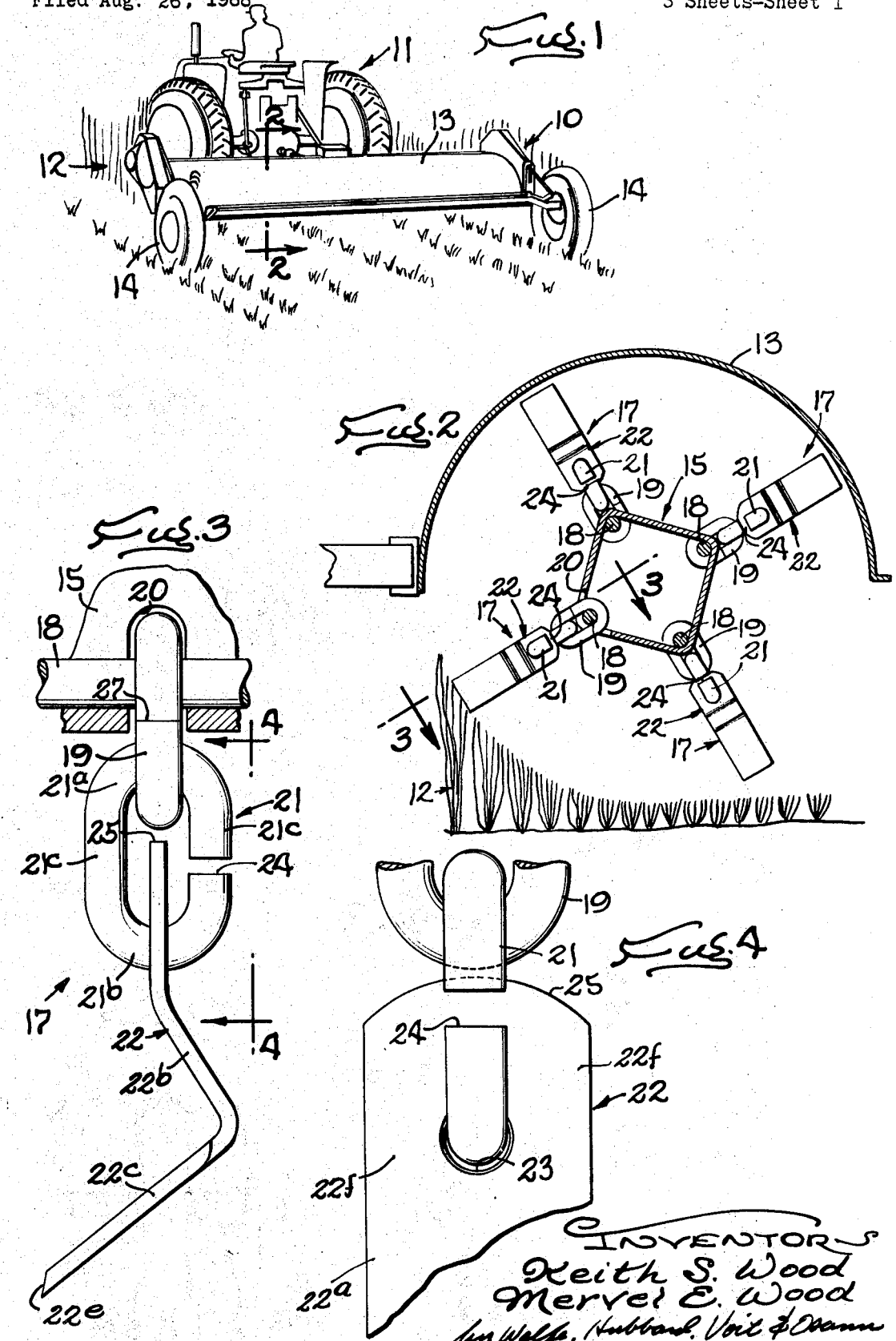

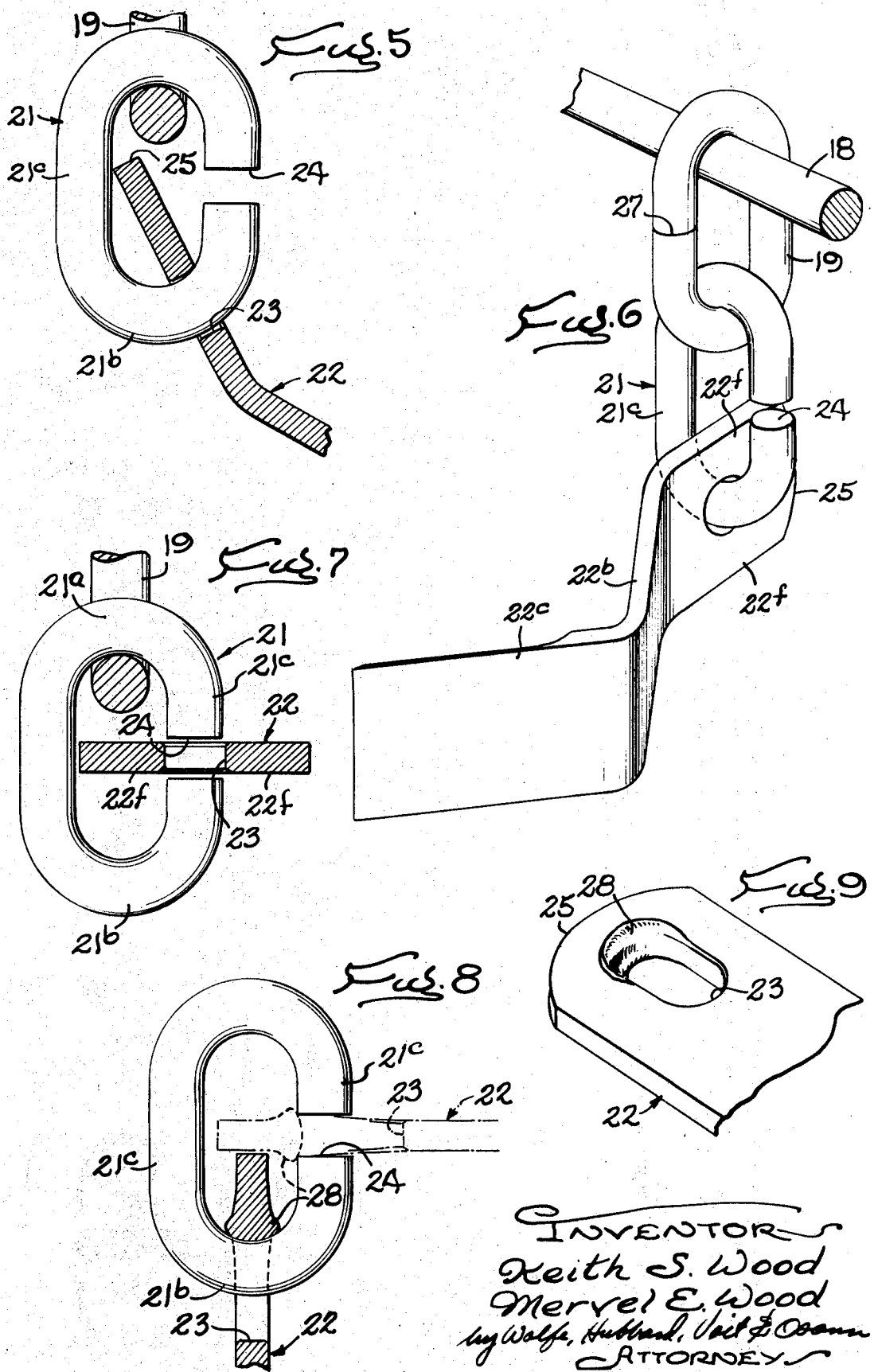

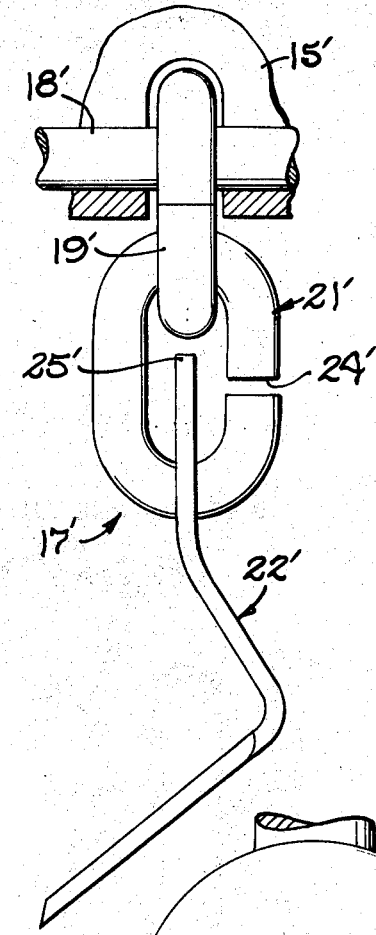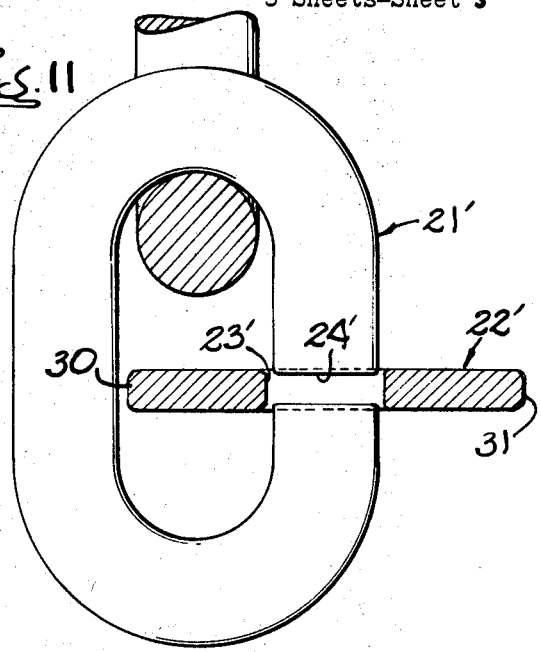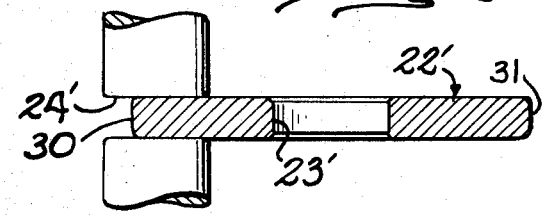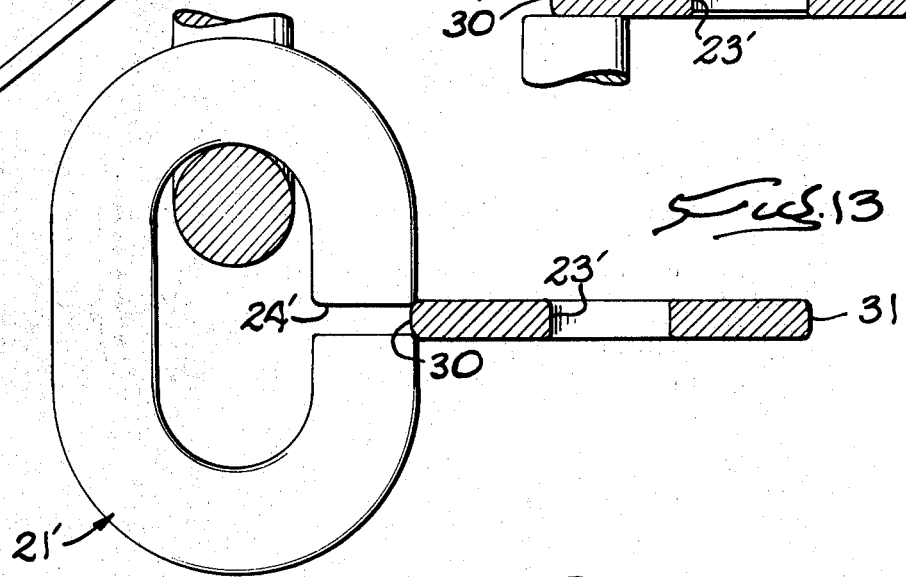

3,527,038
QUICK-CHANGE FLAIL BLADE
Keith S. Wood and Mervel E. Wood, Oregon, Ill., assignors, by mesne assignments, to Hesston of Delaware, Inc., Wilmington, Del., a corporation of Delaware
Continuation-in-part of application Ser. No. 735,829, June 10, 1968. This application Aug. 26, 1968, Ser. No. 767,019
Int. Cl. A01d 55/22
U.S. Cl. 56—294                   19 Claims

ABSTRACT OF THE DISCLOSURE

A flail-type mower having an elongated rotor with cutter assemblies spaced along and around the mower, each cutter assembly comprising a closed connecting link pivotally attached to the mower, an oval attaching link interlinked with the connecting link, and a flail blade having an inner end portion with a hole through which the attaching link extends and an outer cutting end. Formed in one side section of the attaching link is a gap for passing the blade edgewise into the link, the hole being spaced from the inner end of the link a distance about 1½ times the width of the interior of the attaching link while the width of the blade on each side of the hole is less than the width of the interior. Thus, the blade normally is prevented from moving directly to the gap but is removable upon turning of the inner end portion out of the link for sliding of the blade sidewise into alinement with the gap. In one embodiment, the blade must be driven forcibly through the gap before the blade can be detached.

CROSS-REFERENCE TO A RELATED APPLICATION

This application is a continuation-in-part of our copending application Ser. No. 735,829, filed June 10, 1968, and now abandoned.

BACKGROUND OF THE INVENTION

This invention relates to a cutter assembly for a flail-type mower and, more particularly, to the manner of attachment of a flail blade to the rotor of the mower.

Flail-type mowers are well known in the art, and comprise generally a frame adapted to be pulled in a field by a tractor or the like, an elongated rotor journaled on the frame and power driven as the mower is pulled in the field, and a plurality of cutter assemblies arranged along and around the rotor for rotation in radially extended positions in response to the centrifugal force produced by rotation of the rotor, each cutter assembly including an elongated blade pivotally connected to the rotor in a manner that permits a degree of freedom of lateral motion and yielding relative to the rotor. In the past, the blades have been attached to the rotor in several ways including bolting, pinning and with various types of links that permit removal of the blades for replacement or sharpening. With conventional mounting arrangements, removal and installation have been difficult and time-consuming operations because of the relatively large number of blades and the relatively complex manipulations required. Of course, it is important that the blades be securely held on the rotor in view of the high centrifugal forces developed when the mower is in use.

SUMMARY OF THE INVENTION

The present invention provides a novel cutter assembly of quite simple and relatively inexpensive construction in which the blade simply may be slipped into the attaching element, may be removed with equal ease, and is held positively on the rotor by the attaching element in service use without need for conventional fasteners or blocking members of any kind to prevent accidental detachment, even after prolonged service use. More specifically, the invention resides in the use of a generally C-shaped mounting link adapted to be secured to the rotor in conventional manner and having a laterally opening gap in one side through which the blade may be moved edgewise into the link to bring a hole in the blade into position to slide onto the link for movement of the blade into its normal, generally radial, operating position relative to the rotor. To prevent the blade from being detached through the gap in service use, one end of the blade is normally disposed within the link and cooperates with the latter to prevent the blade from returning directly to alinement with the gap, this end of the blade being swingable out of the link upon rotation of the blade in a generally radial plane into a turned position in which the blade is simply slidable into alinement with the gap for edgewise removal. The invention resides in the novel correlation of the shape and size of the link with the length of the inner end portion of the blade and the width of the blade on opposite sides of the attaching hole, and in the sizing of the gap for removal of the blade in its normal condition but to prevent removal of the blade if it should become deformed to an extent that would disable the normal blocking arrangement provided by the link and the inner end portion of the blade. The invention also contemplates correlating the width of the gap with the thickness of the blade in such a manner that the blade cannot be detached from the link unless forcibly driven through the gap.

Other objects and advantages of the invention will become apparent from the following detailed description, taken in conjunction with the accompanying drawings.

BRIEF DESCRIPTION OF THE DRAWINGS

FIG. 1 is a perspective view of a tractor pulling a flail-type mower equipped with cutter assemblies embodying the novel features of the present invention.

FIG. 2 is an enlarged fragmentary cross-sectional view taken substantially along the line 2—2 of FIG. 1 through the rotor of the mower.

FIG. 3 is an enlarged fragmentary cross-sectional view taken substantially along the line 3—3 of FIG. 2, and showing a cutter assembly with the blade in its normal, radially extended position.

FIG. 4 is an enlarged fragmentary cross-sectional view taken substantially along the line 4—4 of FIG. 3.

FIG. 5 is a view similar to part of FIG. 3 with the blade in a moved position, and illustrating the blocking function of the link and the inner end of the blade.

FIG. 6 is a fragmentary perspective view illustrating the rotation of a blade into the turned position preparatory to removal of the blade from the attaching link.

FIG. 7 is a view similar to FIG. 5 with the blade in the turned position and shifted into alinement with the gap for removal from the attaching link.

FIG. 8 is a view similar to FIG. 7 with the blade shown in its normal position in cross section after wear in service use has caused deformation of the mounting hole, the position of the blade during attempted removal or detachment being shown in broken lines.

FIG. 9 is a fragmentary perspective view of the blade in FIG. 8.

FIGS. 10 to 13 illustrate a second embodiment of a cutter assembly incorporating the features of the invention, FIG. 10 being a view similar to FIG. 3.

FIG. 11 is an enlarged view of the blade and the attaching link illustrated in FIG. 10 and showing the blade in the turned position and shifted into alinement with the gap.

FIG. 12 is a view similar to FIG. 11 and showing the blade being moved through the gap.

FIG. 13 is a view similar to FIG. 11 and showing the blade completely out of the gap.

DETAILED DESCRIPTION

As shown in the drawings for purposes of illustration, the invention is embodied in a flail-type mower 10 (FIG. 1) adapted to be pulled in a field by a tractor 11 and operable to sever and shread vegetation 12 growing in the field. Such mowers typically include a semi-cylindrical housing 13 supported at the front by the tractor and at the rear by a pair of ground-engaging wheels 14. Journaled in the housing for rotation about a horizontal axis in a forward or clockwise direction (FIG. 2) is a hollow rotor 15 power-driven by the P.T.O. shaft of the tractor and mounting a plurality of cutter assemblies 17 which cut the vegetation with a flailing action.

Herein, the rotor 15 is of hollow rectangular cross-section and receiver four laterally extending and angularly spaced rods 18 (FIGS. 2, 3 and 6) which are mounted in the corners of the rotor. Each cutter assembly 17 includes a mounting element 19 connected to one of the rods and projecting outwardly through a notch 20 formed in the adjacent corner of the rotor. At its outer end, each mounting element pivotally supports a steel attaching link 21 which, in turn, serves to fasten a relatively heavy metal flail blade 22 to the rotor. The blades are extended radially outwardly by the centrifugal force developed upon rotation of the rotor and, should an obstruction be encountered, are free to swing inwardly or be deflected laterally around the obstruction.

The blades 22 may take various forms that are well known in the art, and in this instance are shown as double-edged "side slicer" blades which are formed from flat metal plates or bars having inner end portions 22$^a$ that extend radially of the rotor in operation, laterally inclined intermediate portions 22$^b$, and oppositely inclined cutting end portions 22$^c$ with beveled side edges 22$^d$ forming the cutting surfaces of the blade and squared and beveled ends 22$^e$. Formed in the inner end portions are mounting holes 23 through which the attaching links 21 pass to secure the blades to the rotor. To permit assembly of such a blade onto its attaching link 21, a gap 24 is formed in one side of the link to receive the blade edgewise into the link for sliding along the latter into the normal operating position.

An example of a known cutter assembly of this general type is shown in Pat. No. 2,711,067 wherein it will be seen that each blade is retained positively on the C-shaped attaching link by a key in one free end of the link and an enlargement formed on the other free end of the link to prevent the blade from slipping off accidentally in service use. This arrangement, of course, requires removal of the keys or the enlargement before the blades may be removed for sharpening or replacement, and the blades are subject to accidental detachment if a key breaks, if an enlargement is worn away under the stresses of service use, or if the mounting hole becomes enlarged sufficiently to permit it to pass around the enlargement.

In accordance with the present invention, the cutter assembly 17 is constructed in a novel manner for quick and easy removal of the blade 22 from the attaching link 21 and yet to hold the blade positively in the link against accidental detachment in service use, even when the assembly is subjected to the shocks and deflection that are common in use, and without need for conventional fasteners, special locking elements or other retaining elements that have been required in the assemblies of the prior art. Moreover, the blade and attaching link with which this important objective is accomplished are of extremely simple and durable construction and are capable of maintaining the assembly intact even after a substantial amount of the wear that may occur in normal use, thus being virtually "fail-safe."

For the foregoing purposes, the hole 23 in the blade 22 is spaced a preselected distance from the inner end 25 so that a preselected length of the blade extends inwardly into the attaching link 21 beyond the hole, and this length is correlated with the width of the interior of the link to prevent the blade from sliding directly into alinement with the gap 24, the inner end of the blade and an opposed inside surface of the link constituting opposed abutment means for accomplishing this end except when the blade is in the turned position. In addition, the gap has a width selected to pass the blade edgewise out of the link with a close fit. Accordingly, the removal of a blade 22 from a link 21 requires first a rotary motion of the blade generally in a radial plane, relative to the cutter, to shift the inner end portion out of the link, followed by broadwise or sidewise sliding motion along the link to the gap, and finally edgewise motion through the gap from a position of close alinement therewith. Because of the forces acting to hold the blades generally radial, the odds against the occurrence of this sequence of motions as a result of normal use are so high as to make an accidental detachment virtually impossible.

In this instance, the connecting member 19 of each assembly is a heavy chain link disposed around one of the rotor rods 18, and the inner end portion of the attaching link 21 extends through the outer portion of the connecting link, the latter preferably being permanently closed as indicated at 27 (FIGS. 3 and 6) and being substantially thicker than the blade 22 and the gap 24 to eliminate the possibility of detachment of the attaching link 21 by passage of the connecting link through the gap. The attaching link has an elongated or oval shape formed by curved inner and outer sections 21$^a$ and 21$^b$ (upper and lower sections in FIG. 3) and straight side sections 21$^c$, the right side section as viewed in FIG. 3 being interrupted by the gap 24 approximately midway between the curved inner and outer sections.

It will be seen in FIGS. 3 and 4 that the mounting hole 23 is spaced outwardly from the inner end 25 of the blade 22 a distance that is substantially greater than the width of the interior of the link 21. Accordingly, as the blade slides along the link toward the gap 24, the inner end 25 rocks or tilts toward, and eventually against, the left side section 21$^c$ and blocks further sliding movement as illustrated in FIG. 5, thus positively preventing the blade from moving into alinement with the gap while the inner end portion is within the link, as it normally is during operation. The blade, of course, is substantially wider than the link. Stated in another way, the inner end of the blade is disposed inwardly of and well beyond the center of curvature of the outer link section 21$^b$ so as to abut against the left side section 21$^c$ as the blade tilts and slides along the curved inner link section.

By rotating the blade 22 about the link 21, however, the inner, blocking end 25 may be swung out of the link as illustrated in FIG. 6, such swinging being possible in any of the generally radial planes in which the blade may lie while the inner end is within the link. The inner blade end preferably is curved on an arc concentric with the mounting hole 23 to facilitate rotation to the turned position. After the blade has been rotated to such a turned position, it is slidable sidewise or broadwise along the link to the position shown in FIG. 7 in alinement with the gap 24. This is permitted by the narrower width of the blade on at least one side of the hole 23, as indicated at 22$^f$ (FIGS. 4 and 7), the width being less than the width of the interior of the link and preferably the same on both sides of the hole. From this position, the blade may be removed edgewise through the gap.

While blades 22 and links 21 of various dimensions may be used, one example is a blade formed from a two inch wide, ¼ inch thick plate with a 9/16 inch mounting hole 23 spaced approximately 1⅛ inch from the inner end 25, or with the hole's center about 1⅜ inch from the inner end and centered between the side edges of the blade. The exemplary attaching link shown in FIGS. 1 to 9 has an interior ¾ inch wide by 1¾ inch long, and a 5/16 inch gap, so that the length of the inner end portion is on the order of 1½ times the link's width and so that the gap is slightly wider than the blade's thickness to permit the blade to move edgewise through the gap with a close but non-interferring fit. The thickness of the connecting link 19 for this combination could be ½ inch.

Thus as previously suggested, removal of the blade 22 of the novel assembly requires a sequence of motions that is quite simple for one who is changing blades but which will not occur accidentally in service use. Accordingly, the blade may be said to be positively held in place while being removed in a quick and simple operation requiring nothing more than movement of the blade into alinement with the gap 24 before withdrawal of the blade from the link 21. Of course, insertion of a blade is accomplished by reversing the sequence, first slipping a blade edgewise through the gap until the hole 23 is alined with the straight lower part of the right hand section 21c, and threading the blade onto the link.

The "fail-safe" feature is illustrated in FIGS. 8 and 9 wherein it will be seen that the stresses of normal use over a prolonged period of time may result in deformation of the blade 22 at 28 and resultant elongation of the hole 23 sufficiently to shorten the inner end portion of the blade to less than the width of the interior of the link 21. If this occurs, of course, the blade subsequently may slide along the link into alinement with the gap 24 while the inner end is within the link. It will be seen, however, that such deformation will be accompanied by thickening of the blade along a substantial portion of the periphery of the hole along the inner side thereof (see FIG. 9) and that this thickened portion constitutes an abutment preventing blade loss by blocking movement of the blade through the gap except after turning of the thickened portion out of the attaching link, just as before such deformation occurred.

From the foregoing, it will be seen that the cutter assembly 17 shown in FIGS. 1 to 9 is of extremely simple construction, using only a link having an interior of selected width and a gap on one side of selected width, and a blade of selected thickness with a mounting hole spaced from the inner end of the blade a distance correlated with the dimensions of the link. At the same time, this assembly eliminates the need for special fasteners, deformation of the link, or other precautionary measures, holds the blade positively during operation, and releases the blade for removal in response to very simple manipulation of the blade.

A second cutter assembly which incorporates all of the novel features of the cutter assembly 17 of the first embodiment and which, in addition, is held even more positively against removal from the attaching link during operation is shown in FIGS. 10 to 13 in which parts corresponding to those of the first embodiment are indicated by the same but primed reference numerals. In this instance, the gap 24' in the attaching link 21' is sized to receive the blade 22' with a close interference fit such that the blade must be forced or hammered edgewise through the gap in order to attach the blade to and detach the blade from the link. As the blade is forced through the gap, the ends of the link defining the gap spread apart to allow the blade to pass through the gap until the hole 23' becomes alined with the link. Thereafter, the gap ends snap toward one another to their original positions by virtue of the resiliency of the metal of the link and prevent detachment of the blade regardless of its position in the link.

More specifically, the gap 24' is about 1/16 inch narrower than the thickness of the blade 22' and, in the exemplary cutter assembly 17', a 3/16 inch gap is used with a blade made from a ¼ inch plate so that the blade may be forced through the gap without permanently deforming the metal of the link. To attach the blade, the latter is held with one side edge 30 alongside the gap as shown in FIG. 13 and is struck forcibly along the other side edge 31 by a hand hammer or the like. As a result of the driving force applied to the blade, the metal of the link yields to allow the gap ends to spread and admit the blade into the link. Preferably, the side edges of the blade are slightly beveled or rounded to facilitate insertion of the blade into the gap.

After the hole 23' becomes alined with the link 21', the resiliency of the metal of the link causes the gap ends to move toward one another to approximately their original positions so as to reduce the width of the gap to a dimension less than the thickness of the blade and thereby captivate the blade within the link. Accordingly, the blade will not become detached from the link even if by chance the blade should be moved through a sequence of motions in which the inner end portion 25' turns in a radial plane through the link and is followed by sliding of the blade along the link into alinement with the gap.

Detachment of the blade 22' is effected by first moving the blade into alinement with the gap 24' as shown in FIG. 11. The blade then is hammered on its inner side edge 30 to cause the metal at the edges of the hole 23' to spread the gap ends sufficiently far to permit passage of the blade. The edges of the hole also are beveled or rounded so that the gap ends may be spread more easily.

We claim as our invention:

1. In a cutter assembly for a flail-type mower having a power-driven rotor, the combination of, a blade in the form of a flat plate having a curved inner end adapted to be positioned adjacent said rotor and an outer cutting end, said blade being formed with a hole spaced outwardly a preselected distance from said inner end, and a generally C-shaped attaching link having a U-shaped outer end section extending through said hole with a close sliding fit, an inner end section for connection to said rotor, and a laterally opening gap on one side of the link slightly wider than the thickness of said plate adjacent said hole for edgewise insertion and removal of the blade with a close fit, said blade having an inner end portion between said hole and said inner end normally disposed within said link and positioned within said link to abut against the latter upon lateral tilting of the blade in its normal position thereby to prevent movement of the blade from said normal position directly into alinement with said gap, and said inner end portion being swingable out of said link upon rotation of said blade about the outer end section of the link into a turned position for sliding of the blade along the link into alinement with said gap and edgewise removal from said link.

2. The combination defined in claim 1 in which the interior of said link is of a first preselected width, said blade is of a second preselected width on at least one side of said hole, and said inner end portion is of a preselected length, said length being greater than said first width and said second width being less than said first width.

3. The combination defined in claim 2 in which said hole is centered on said blade between the side edges thereof, said length is greater than the width of said blade on each side of said hole, and said first width being sufficiently greater than said second width to permit sidewise movement of the blade along the link into alinement with said gap after turning of said inner end portion out of the link.

4. The combination as defined in claim 2 in which said link has substantially straight and parallel side sections, one being formed with said gap approximately midway between said end sections.

5. The combination as defined in claim 1 further including a connecting link having a thickness greater than the width of said gap, said connecting link extending through said attaching link adjacent said inner end section.

6. In a cutter assembly for a flail-type mower having a power-driven rotor, the combination of, a blade having an inner end adapted to be positioned adjacent said rotor and an outer cutting end, said blade being formed with a hole spaced outwardly from said inner end, and a generally C-shaped link extending through said hole with a sliding fit and having a laterally opening gap on one side thereof, said link having an inner end for connection to said rotor and a U-shaped outer end section for retaining said blade on the link during rotation of the cutter assembly, said blade having an inner end portion between said hole and said inner end of the blade normally disposed in a generally radial plane within said link but swingable out of the link into a turned position upon rotation of the blade about the link in said plane, said gap being wider than the thickness of said blade adjacent said hole whereby the blade is removable edgewise from the link after sliding along the latter to said gap in said turned position, and said inner end portion of said blade extending inwardly from said hole far enough to abut against the link and prevent sliding of the blade directly around the link to said gap.

7. The combination of, an elongated blade in the form of a flat plate having a mounting hole adjacent one end and a cutting edge adjacent the other end; a generally C-shaped attaching link having one end section extending through and disposed within said hole with a sliding fit, an opposite end section disposed beyond said one blade end, spaced side sections, and a laterally opening gap in one of said side sections sized to pass said blade edgewise into the link with a close fit to bring said hole into alinement with the link at said gap for assembly of the blade onto the link; and opposed abutment means on said link and said inner end of said blade preventing tilting and sliding of the blade along the link into alinement with said gap while said inner end is within the link whereby the blade is removable only while said inner end is disposed outside the link.

8. The combination defined in claim 7 in which said link has a first preselected width between said side sections, and said blade is of a second preselected width on each side of said hole and of preselected length between said hole and said one end, said length being greater than said first width, and said second width being less than said first width.

9. The combination defined in claim 8 in which said side sections are substantially straight and parallel, said gap is centered on one of said side sections, and said length is on the order of 1½ times said first width.

10. The combination as defined in claim 8 in which said inner end is curved on an arc concentric with said hole to facilitate rotation of the blade to shift said inner end out of said link.

11. The combination defined in claim 7 in which said link has an elongated, generally oval shape with straight side sections, and said one end section of the link has a preselected curvature, said one end of said blade being disposed well beyond the center of said curvature for tilting into abutting engagement with one of said side sections as the blade moves around the link toward said gap.

12. The combination defined in claim 8 further including a connecting link extending through said attaching link, said connecting link having a thickness less than said first width and greater than the width of said gap.

13. The combination defined in claim 7 in which said gap is slightly wider than the thickness of said plate adjacent said hole for free edgewise passage of the blade into and out of the gap.

14. The combination defined in claim 7 in which said gap is slightly narrower than the thickness of said plate adjacent said hole and restricts free edgewise passage of the blade into and out of the gap.

15. The combination of, an elongated blade in the form of a flat plate having a mounting hole adjacent one end and a cutting edge adjacent the other end; a generally C-shaped attaching link having one end section extending through and disposed within said hole with a sliding fit, an opposite end section disposed beyond said one blade end, and a laterally opening gap sized to pass said blade edgewise into the link with a close fit to bring said hole into alinement with the link at said gap for assembly of the blade onto the link, and opposed abutment means on said link and on said blade, between said hole and said inner end thereof, preventing sliding of said blade along the link and endwise through said gap, whereby said blade is removable from said link only after turning of the blade to swing said abutment means out of the link.

16. The combination defined in claim 15 in which said abutment means are the inner end of said blade and a side surface of said link positioned to prevent tilting of the blade directly into alinement with said gap.

17. The combination defined in claim 15 in which said abutment means include a thickened portion of said blade along the inner side of said hole thicker than the width of said gap, said blade being narrower than said gap on at least one lateral side of said hole.

18. The combination of, an elongated blade in the form of a flat plate having a mounting hole adjacent one end and a cutting edge adjacent the other end; a generally C-shaped attaching link having one end section extending through and disposed within said hole with a sliding fit, an opposite end section disposed beyond said one blade end, and a laterally opening gap sized to pass said blade edgewise into the link with a close fit to bring said hole into alinement with the link at said gap for assembly of the blade onto the link, said blade having an inner end portion normally disposed within said link and swingable out of the link upon turning of the blade about the link, and also having a thickened portion along the inner side of said hole preventing withdrawal of the link endwise through said gap while permitting edgewise movement of the blade through the gap after turning of said thickened portion out of said link.

19. The combination of, an elongated blade in the form of a flat plate of predetermined thickness having a mounting hole adjacent one end and a cutting edge adjacent the other end; a generally C-shaped metal attaching link having one end section extending through and disposed within said hole with a sliding fit, having an opposite end section disposed beyond said one blade end, and having a laterally opening gap, said gap being slightly narrower than the thickness of said plate adjacent said hole to restrict edgewise movement of the blade through the gap, and the metal of said link being resiliently yieldable to enable the gap to spread to a width greater than the thickness of the plate to permit the blade to be forcibly driven through the gap and removed from the link.

References Cited

UNITED STATES PATENTS

| | | | |
|---|---|---|---|
| 3,043,080 | 7/1962 | Mott | 56—294 |
| 3,122,871 | 3/1964 | Frevik et al. | 56—294 |

ANTONIO F. GUIDA, Primary Examiner